United States Patent
Janning

[11] 3,964,158
[45] June 22, 1976

[54] METHOD OF MAKING A LIQUID CRYSTAL DISPLAY CELL

[76] Inventor: John L. Janning, 332 Vindale Drive, Dayton, Ohio 45440

[22] Filed: June 19, 1974

[21] Appl. No.: 480,665

Related U.S. Application Data

[60] Division of Ser. No. 386,472, Aug. 7, 1973, Pat. No. 3,834,792, which is a continuation of Ser. No. 242,675, April 10, 1972, abandoned.

[52] U.S. Cl. ............................ 29/592; 350/160 LC; 427/109; 427/124; 427/125
[51] Int. Cl.² ............................................ G02F 1/13
[58] Field of Search ............ 29/25.11, 25.13, 25.14, 29/25.17, 25.18; 316/3–7; 117/37, 4 S, 61, 54, 66, 69, 71 R, 93.1 CD, 93.1 PF, 93.1 GD, 97, 107, 107.2, 119, 201, 211, 213, 215, 217, 229; 204/38 S, 192; 427/109, 124, 125; 350/150, 160 LC; 23/230 LC; 118/48, 49, 49.1, 49.5, 50, 50.1, 640; 29/592, 625

[56] References Cited
UNITED STATES PATENTS

| | | | |
|---|---|---|---|
| 3,046,839 | 7/1962 | Bird et al. | 117/45 X |
| 3,218,496 | 11/1965 | Jensen et al. | 117/217 UX |
| 3,388,002 | 6/1968 | Foster | 117/217 |
| 3,391,022 | 7/1968 | Saito | 117/215 |
| 3,597,043 | 8/1971 | Dreyer | 350/150 X |
| 3,674,341 | 7/1972 | Hedman et al. | 350/150 X |
| 3,781,085 | 12/1973 | Leibowitz | 350/160 LC X |
| 3,811,751 | 5/1974 | Myer | 350/160 LC |

*Primary Examiner*—Carl E. Hall

[57] ABSTRACT

The present invention relates to a liquid crystal display cell having an alignment film therein. The present invention also relates to a method of aligning liquid crystal molecules in a selected direction in a liquid crystal display cell. An alignment film whose film growth is oriented in the same direction is deposited on an electrode film of a liquid crystal cell. The alignment film is used to align the molecules of a liquid crystal material. The film growth sympathetically aligns the molecules of liquid crystals in the direction of the film growth. A liquid crystal display cell which has two such alignment films therein is used to form a polarizing liquid crystal display cell.

18 Claims, 10 Drawing Figures

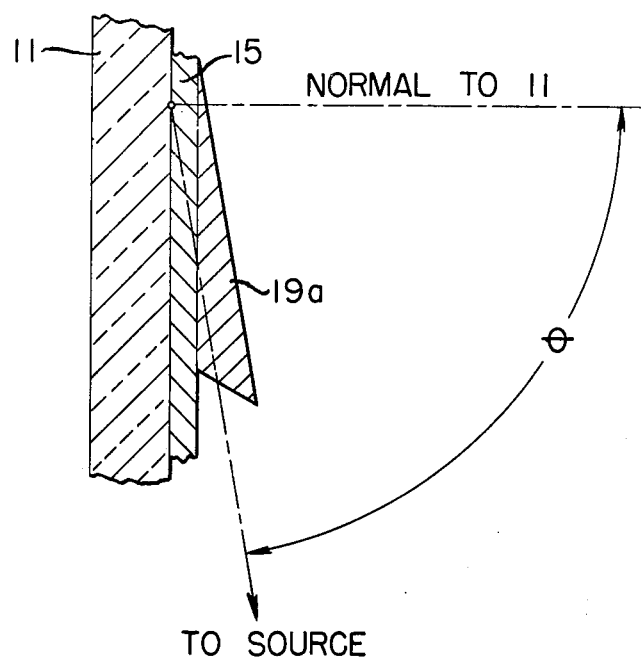

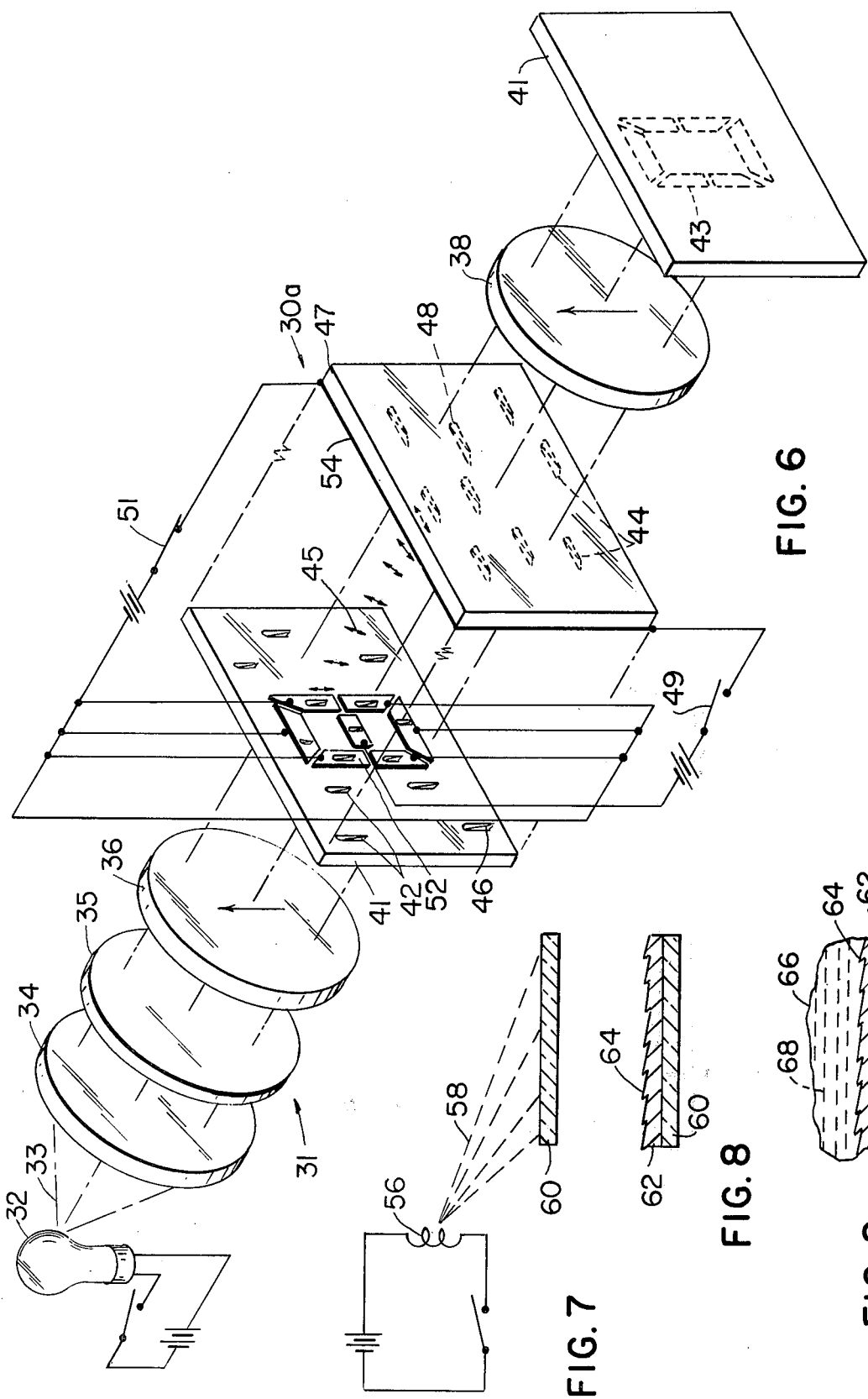

METHOD OF MAKING A LIQUID CRYSTAL DISPLAY CELL

CROSS-REFERENCE TO RELATED APPLICATION

This application is a division of my co-pending application, Ser. No. 386,472, filed Aug. 7, 1973, which issued as U.S. Pat. No. 3,834,792 on Sept. 14, 1974 and assigned to the same assignee of this invention, which is a continuation of my application Ser. No. 242,675, filed Apr. 10, 1072, now abandoned.

BACKGROUND OF THE INVENTION

In the prior art a method of aligning molecules of a liquid crystal material in a chosen direction involves the step of rubbing the surface of an electrode film on a substrate in a chosen direction with a rubbing cloth. The rubbing causes the material of the surface of the electrode film on the substrate to be oriented into the chosen direction. When a liquid crystal material is placed on the rubbed electrode film, the molecules of the liquid crystal material are sympathetically aligned in the direction of rubbing of the electrode film. A liquid crystal display cell, which has two electrode films which are rubbed in perpendicular directions, is also known in the prior art.

In the present invention a thin alignment film whose film growth is orientated by vacuum deposition in a given direction is formed on an electrode film. The thin alignment film will, according to present theory, sympathetically align liquid crystal molecules of a liquid crystal material, when said liquid crystal material is placed on said thin alignment film. The thin alignment film is grown in a desired direction by vacuum depositing material on the electrode film from a large angle relative to the normal of the electrode film. Two such thin alignment films may be used on two electrode films of a liquid crystal display cell to form a polarizing liquid crystal display cell.

The method of the present invention given more consistent and predictable alignment results than the prior art method. The rubbing method of the prior art is pressure sensitive and not easily reproducible whereas the alignment film of the present invention is more reproducible due to the use of vacuum deposition which may be accurately controlled.

SUMMARY OF THE INVENTION

The present invention relates to a method of making an alignment film for liquid crystal material on a substrate comprising depositing an alignment film on a selected material at a selected angle to a substrate in order to form a film growth of said alignment film at said selected angle to said substrate.

An object of the present invention is to provide an alignment film for aligning molecules of a liquid crystal material.

Another object of the present invention is to provide a liquid crystal display cell which has an alignment film on each of two electrode films thereof in order to align molcules of a liquid crystal material therein.

A further object of the present invention is to form a liquid crystal display cell wherein an alignment film is deposited on an electrode film having an image-forming pattern etched therein.

Still another object of the present invention is to provide a liquid crystal display cell including an alignment film which has an image-forming pattern etched therein.

DESCRIPTION OF THE DRAWINGS

FIG. 5 is a sectional view of an alignment film of FIG. 4.

FIG. 6 is a diagrammatic view of an electrooptical system for reproducing an image which has been etched in an electrode film, the etched electrode film having an alignment film and a substrate thereunder.

FIG. 7 is a diagrammatic view of a deposition step for forming an alignment film on a substrate.

FIG. 8 is a sectional view, exaggerated for purposes of illustration, of a substrate which has an alignment film deposited thereon.

FIG. 9 is a sectional view, exaggerated for purposes of illustration, of a liquid crystal material having molecules of a liquid crystal material aligned by an alignment film on a substrate.

DESCRIPTION OF THE PREFERRED EMBODIMENT

Figure 1:
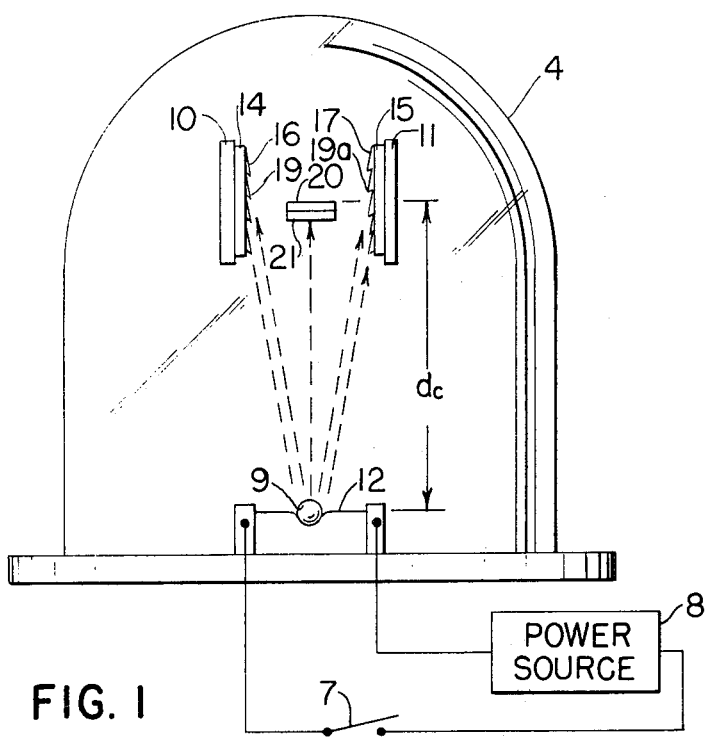
FIG. 1 is a diagrammatic view of an evaporation system for forming an alignment on each of two substrates.

As shown in FIG. 1, substrates 10 and 11, such as glass substrates, having electrode films 14 and 15, such as tin oxide electrode films, previously formed thereon, are positioned in a vacuum chamber 4. A vacuum deposition source 12 for an alignment material 9, such as platinum, gold, tin, lead, aluminum, copper, silver, silicon monoxide or chromium, is located beneath the substrates 10 and 11. The substrates 10 and 11 may be any nonconductive substrates. The electrode films 14 and 15 are conductive electrode films. The electrode films 14 and 15 are transparent. The vacuum deposition source 12 is used to vacuum deposit alignment films 16 and 17 of alignment material 9 on the electrode films 14 and 15 at a chosen angle to the normal to the substrates 10 and 11. In the present embodiment, the normals to the surfaces of the electrode films 14 and 15 each makes a chosen angle $\theta$ of approximately 80° with a line between the substrates 10 and 11 and the evaporation source 12. As shown in FIG. 5, the angle $\theta$ is the measure of that angle formed by the substantially coincident normals to the respective surfaces of both the substrate 11 and the electrode film 15 formed thereon, where applicable and the line drawn between the base of the normal to the surface of the substrate 11 and the evaporation source 12. In a similar manner the angle $\theta$ is the measure of that angle formed by the substantially coincident normals to the respective surfaces of both the substrate 10 and the electrode film 14 formed thereon, where applicable, and the line between the base of the normal to the surface of the substrate 10 and the evaporation source 12. The larger the chosen angle $\theta$ the better will be the alignment of liquid crystal material later placed on the alignment films 16 nd 17. However, the larger the chosen angle θ, the greater the amount of starting alignment material 9 needed to form a desired thickness of alignment films 16 and 17. Therefore a chosen angle θ of 80° is considered optimum. A range of from 10° to 89.9° of θ will however serve to form alignment films 16 and 17. The alignment films 16 and 17 are formed on the electrode films 14 and 15 by vacuum deposition. The alignment films 16 and 17 could alternately be deposited directly on the substrates 10 and 11. Alternately the electrode films 14 and 15 themselves could be deposited at an angle on the substrates 10 and 11 and thus act simultaneously as alignment films and electrode films. The electrode films 14 and 15 would then be aligning electrode films. The electrode films 14 and 15 which are on substrates 10 and 11 resepctively, are approximately 500 angstrom thick transparent tin oxide electrode films. The 80° angle in the illustrated embodiment made between the normals to the surfaces of the electrode films 14 and 15 and the point of the vacuum deposition source 12 of FIG. 1, is used to form film growths 19 and 19a of alignment films 16 and 17 at an angle of approximately 80° to the normals to the surfaces of the electrode films 14 and 15. These film growths 19 and 19a of alignment films 16 and 17 are used to sympathetically align molecules of a liquid crystal material which is to be placed on the alignment films 16 and 17. A small amount of platinum or other alignment material is evaporated at a pressure of approximately $10^{-5}$ Torr from the vacuum deposition source 12 at an approximately 80° angle to substrates 10 and 11 for a short period of time to form film growths 19 and 19a of alignment films 16 and 17 on electrode films 14 and 15. In FIG. 1, 20 angstrom thick platinum alignment films 16 and 17 are evaporated on the 500 angstrom thick tin oxide electrode films 14 and 15 of substrates 10 and 11. The evaporation occurs when switch 7 is closed to heat the alignment material 9 to be evaporated. The evaporation process is a boiling process of the alignment material 9. The power for the heating comes from power source 8. Other materials which form film growths 19 and 19a, such as chromium, may be used as an alignment film. Platinum film growths 19 and 19a of alignment films 16 and 17 are formed on the tin oxide transparent electrode films 14 and 15 at an angle of approximately 80° to the normal to the surfaces of the transparent electrode films 14 and 15. The angle θ is not very critical and may be from approximately 10° to approximately 89°. The thickness of the alignment film is not critical and may vary from 20 angstroms upward.

In the illustrated embodiment of FIG. 1, the distance da between the evaporation source 12 and points on the substrates 10 and 11 is approximately 10 inches. A control slide 20 is placed a distance dc of approximately 10 inches above evaporation source 12 with its lower surface facing toward the evaporation source 12. A control film 21 which is measurable is used to calculate the thickness of the alignment films 16 and 17 after evaporation has occurred. The control slide 20 is used to insure that the desired thicknesses of alignment films 16 and 17 are placed on the electrode films 14 and 15. The calculated thickness Ta of the alignment films 16 and 17 equals the measured thickness Tc of the control film 21 on the control slide 20, multiplied by the cosine of the chosen angle θ, divided by da over dc quantity squared. By measuring the thickness Tc of the deposited control film 21 on the control slide 20, measuring the present angle θ made between the normals to the surfaces of the transparent electrode films 14 and 15 and the evaporation source 12, and by measuring the preset distance d between the substrates 10 and 11 and the evaporation source 12, one can calculate the thickness Ta of the alignment films 16 and 17 by the thickness equation $$Ta = \frac{Tc \text{ cosine } \theta}{\frac{(da)^2}{(dc)}}.$$

A thickness of alignment films 16 and 17 of about 20 angstroms is used. Such thin alignment films 16 and 17 are electrically conductive. Such thin alignment films may actually be islands of alignment material.

Figure 2:
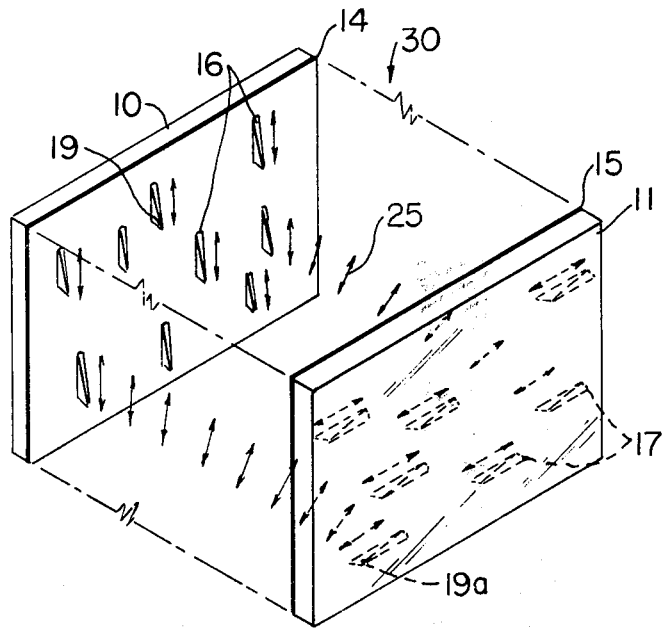
FIG. 2 is an isometric view of a liquid crystal display cell having two alignment films therein.

FIG. 2 is an isometric view which illustrates a fabricated liquid crystal display cell 30. The substrates 10 and 11 of the liquid crystal display cell 30 have tin oxide electrode films 14 and 15 and platinum alignment films 16 and 17 thereon, to either side of molcules 25 of a liquid crystal material. The alignment films 16 and 17 are used to sympathetically align molecules 25 of the liquid crystal material in the directions of the growths 19 and 19a of the alignment films 16 and 17. The film growth 19 of the alignment film 16 is pointing at right angles to the film growth 19a of the alignment film 17 due to the rotation of the substrate 11 of FIG. 1 by 90° during the fabrication of liquid crystal display cell 30.

Figure 3:
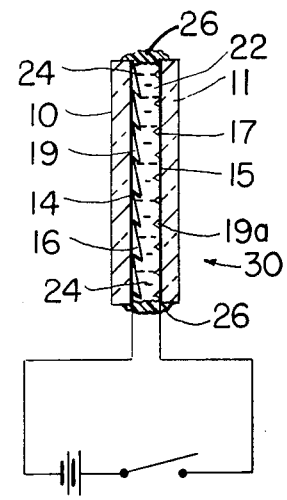
FIG. 3 is a sectional view of the liquid crystal display cell of FIG. 2.

As shown in FIG. 3, nematic liquid crystal material 22, such as 4-Methoxy, 4'n-Butyl-Benzylidene-Anilene (MBBA), is placed between the platinum alignment films 16 and 17 which are on the electrode films 14 and 15, prior to final sealing the liquid display cell 30, with a sealer 26 having been placed around the periphery of the glass substrate plates 10 and 11 to seal the liquid crystal material 22 within the liquid crystal display cell 30. One half mil thick spacers 24 separate the two alignment films 16 and 17. The liquid crystal molecules of the left portion of the liquid crystal material 22 in the liquid crystal display cell 30 are aligned in a direction parallel to the direction of the platinum film growth 19 of alignment film 16. The liquid crystal molecules of the right portion of the liquid crystal material 22 in the liquid crystal display cell 30 are aligned in a direction parallel to the direction of the platinum film growth 19a of alignment film 17. The liquid crystal material 22 will thus rotate polarized light passing therethrough by 90° since the molecules of the liquid crystal material 22 of the liquid crystal display cell 30 is twisted by 90°.

Figure 4:
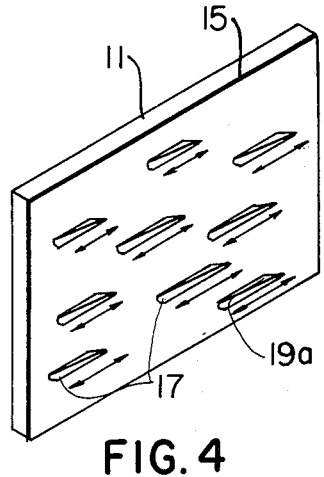
FIG. 4 is a perspective view of an alignment film of FIG. 2.

FIGS. 4 and 5 show the film growth 19a of the alignment film 17 of FIGS. 2 and 3 in greater detail. Also shown are electrode film 17 and substrate 11.

In FIG. 6, a liquid crystal display cell 30a is placed in an optical system 31 which includes a light source 32, such as an incandescent lamp. A collimating lens 34 collimates light 33 from the light source 32, and an optical filter 35 filters out the ultraviolet and infrared light before the light 33 passes through a polarizer 36 which is used to polarize the light 33. A polarizer 38 is used to analyze the plane in which light 33 is polarized by polarizer 36. A screen 41 is used to display a bright image of any of ten numerals formed of selected segments of a segmented numeral 52 and 8 etched in a tin oxide electrode layer. The background of the pattern of the segmented numeral 52 is etched away from an electrode film previously deposited on the substrate 41 of the liquid crystal display cell 30a by standard photo etching technique to leave the segmented numeral 52. A thin nonconductive platinum alignment film 42 covers the total area of the substrate 41 and the segmented numeral 52. Another thin nonconductive platinum alignment film 44 covers an unetched electrode film 54 on the substrate 47. The segmented numeral 52 and electrode film 54 are transparent since they are very thin. The film growths 46 and 48 of the two alignment films 42 and 44 are at right angles. Molecules 45 of a liquid crystal material are aligned between alignment films 42 and 44.

A bright image of the segmented numeral of a 0 may be read out of the dark screen 41 of the display cell 30a by placing the display cell 30a between the polarizers 36 and 38, with the film growth 46 of the alignment film 42 parallel to the plane of polarization of the polarizer 36, with switch 49 open. The film growth 48 of the alignment film 44 is perpendicular to the plane of polarization of the polarizers 36 and 38.

When switch 51 is closed to create an electric field between the outer segments of the segmented numeral 52 and the electrode film 54 of the liquid crystal display cell 30a, the molecules of the liquid crystal material 45 in the display cell 30a, next to the outer segments of the segmented numeral 52 are oriented parallel to the electric field. Thus an image 43 of a 0 appears on the screen 41. When switch 51 is opened, the bright outer segments of the segmented numeral 52 disappears from the screen 41. Numerals zero to nine may be read out of the liquid crystal display cell 30a when a voltage is applied to selected segments of the segmented numeral 52.

FIG. 7 shows alignment material 58 being evaporated at a large angle relative to the normal to a substrate 60 to form an alignment film 62 shown in FIGS. 8 and 9. When the alignment material 58 is evaporated on the substrate 60 from the evaporation source 56 at a large angle, alignment film 62 is formed on the surface of the substrate 60 as shown in FIG. 8. The alignment film 62 has a film growth 64 therein.

As shown in FIG. 9, liquid crystal material 66 is placed on the alignment film 62. Molecules 68 of the liquid crystal material 66 which are adjacent to the alignment film 62 are aligned in the direction of the film growth 64 of the alignment film 62.

Figure 10:
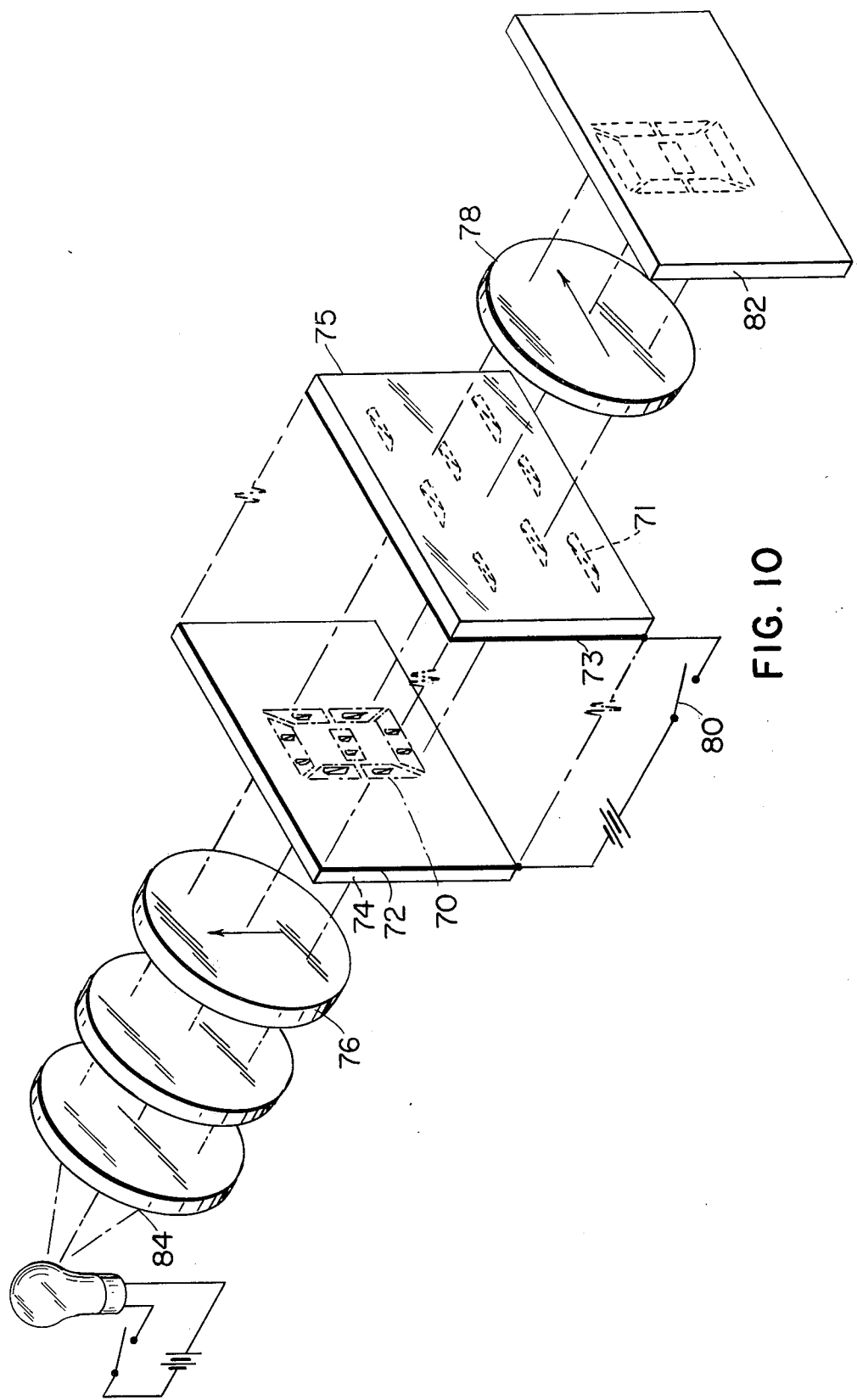
FIG. 10 is a diagrammatic view of an electrooptical system for reproducing an image which has been etched in an alignment film which has an electrode film thereunder.

As shown in FIG. 10, which is similar to FIG. 6, the alignment film 70 has a pattern etched therein. The etched alignment film 70 is on an electrode film 72 on the substrate 74. An unetched alignment film 71 is on the electrode film 73 on substrate 75. The plane of polarization of polarizer 78 is at a 90° angle with respect to plane of polarization of polarizer 76. When a voltage is not applied between the electrode films 72 and 73, by not closing switch 80, the etched pattern in alignment film 70 is made visible on screen 82 by means of light 84. When a voltage is applied between the electrode films 72 and 73 by closing switch 80, the etched pattern in alignment film 70 is not visible on screen 82, and the screen 82 becomes dark.

I claim:

1. A method of forming a liquid crystal display cell, comprising:
    a. positioning at least a portion of a surface of a transparent container so that it makes a selected acute angle with respect to the direction from a deposition source for a selected material;
    b. depositing a transparent alignment film from said deposition source onto said portion of said surface of said container in order to form a transparent film growth at approximately said selected acute angle to said inner surface of said container; then
    c. forming a container including said portion such that the transparent alignment film faces the interior of the container;
    d. filling said container with liquid crystal material in contact with the alignment film whereby molecules of the liquid crystal material adjacent the alignment film are aligned in a direction parallel to the film growth.

2. A method of making a liquid crystal display cell, comprising:
    a. positioning first and second planar transparent substrates at a selected acute angle with respect to the direction from said substrate to a deposition source for a selected material;
    b. depositing a transparent alignment film from said deposition source onto each of said first and second substrates in order to form a transparent film growth in said alignment film at approximately said selected acute angle to the normals to the first and second substrates;
    c. forming a container including the first and second substrates such that the alignment films face the interior of the container; and
    d. filling said container with liquid crystal material in contact with the alignment film on each substrate whereby molecules of the liquid crystal material adjacent the alignment film are aligned in a direction parallel to the film growth.

3. The method of claim 2 wherein said selected acute angle is in the range of from 10° to 89.9°.

4. The method of claim 2 wherein the transparent film growth of the alignment films on the first and second substrates which form the container for the liquid crystal material are oriented parallel and opposed to each other and rotated with respect to each other in order to form a liquid crystal display cell which rotates polarized light by a selected number of degrees.

5. The method of claim 2 wherein the first and second substrates have an electrode film on at least one side thereof, the electrode films positioned adjacent to said deposition source.

6. A method of making a liquid crystal display cell, comprising:
    a. positioning first and second planar transparent substrates in an evaporation chamber at a selected acute angle with respect to the direction from said substrates to an evaporation source for a selected material in the evaporation chamber;
    b. evaporating a transparent alignment film from said evaporation source onto each of said first and second substrates in order to form a transparent film growth of said alignment films at approximately said selected acute angle to each of said substrates;
    c. orienting the first and second substrates with respect to each other whereby the film growth of the alignment film on one of the substrates is spaced from and opposite to the film growth of the alignment film of the other substrate;
    d. forming a container including the first and second substrates such that the alignment films face the interior of the containers; and
    e. filling said spaced substrates with liquid crystal material in contact with the alignment films whereby molecules of the liquid crystal material adjacent the alignment film are aligned in a direction parallel to the film growth.

7. The method of claim 6 wherein the directions of alignment of the transparent film growths on the first and second substrates which form the container for the liquid crystal material are rotated with respect to each other in order to form a liquid crystal display cell which rotates polarized light by a selected number of degrees.

8. The method of claim 6 wherein each of the first and second substrates have an electrode film on at least the side adjacent to said evaporation source.

9. A method of making a liquid crystal display cell which has a pattern stored therein, comprising:
  a. positioning first and second planar, transparent substrates in an evaporation chamber at a selected acute angle with respect to the direction from said substrate to an evaporation source for a selected material in the evaporation chamber, the first and second substrates having an electrode film thereon, a pattern having been formed in the electrode film of the first substrate;
  b. evaporating a transparent alignment film from said evaporation source onto the electrode film of each of said first and second substrates in order to form a transparent film growth at approximately said selected acute angle to each substrate;
  c. orienting the first and second substrates with respect to each other whereby the film growth of the alignment film on each of the substrates is opposite to the film growth of the alignment film of the other substrate;
  d. forming a container including the first and second substrates such that the alignment films face the interior of the container; and
  e. filling said container with liquid crystal material in contact with said alignment films in order to form a liquid crystal display cell whereby molecules of the liquid crystal material adjacent the alignment film are aligned in a direction parallel to the film growth.

10. The method of claim 4 wherein the select number of degrees the polarized light is rotated is 90°.

11. The method of claim 7 wherein the selected number of degrees the polarized light is rotated is 90°.

12. A method of making a container for holding liquid crystal material and for aligning the molecules thereof, comprising:
  a. positioning first and second planar, transparent substrates at a selected acute angle with respect to a source for depositing a selected material;
  b. depositing a transparent alignment film from the source onto each of the first and second substrates in order to form a transparent film growth in said alignment film at approximately the selected acute angle to the normals to the first and second substrates;
  c. positioning the substrates in parallel planes with the alignment film of one substrate facing the alignment film of the other substrate; and
  d. forming a container including the first and second substrates such that the alignment films face the interior of the container whereby when the container is filled with liquid crystal material the molecules of the liquid crystal material adjacent the alignment film are aligned in a direction parallel to the film growth.

13. The method of claim 12 wherein said selected acute angle is in the range of from 10° to 89.9°.

14. The method of claim 12 wherein the film growth of the transparent alignment films on the first and second substrates which form the container for the liquid crystal material are oriented parallel and opposed to each other and rotated with respect to each other in order to form a cell capable of rotating polarized light by a selected number of degrees.

15. The method of claim 12 wherein the first and second substrates have a transparent electrode films on sides adjacent the deposition source.

16. A method of making a container for holding liquid crystal material and for aligning the molecules thereof, comprising:
  a. positioning first and second planar, transparent substrates in an evaporation chamber at a selected acute angle with respect to an evaporation source for a selected material in the evaporation chamber;
  b. evaporating a transparent alignment film from the evaporation source onto each of the substrates to form a growth of transparent alignment films at approximately said selected acute angle to each of said substrates;
  c. orienting the first and second substrates with respect to each other in parallel planes with the film growth of the alignment film on one of the substrates oriented to face the film growth of the alignment film of the other substrate; and
  d. forming a container including the first and second substrates such that the alignment films face the interior of the container whereby when the container is filled with liquid crystal material the molecules of the liquid crystal material adjacent the alignment film are aligned in a direction parallel to the film growth.

17. The method of claim 16 wherein the directions of alignment of the transparent film growths on the first and second substrates which form the container for the liquid crystal material are rotated with respect to each other in order to form a liquid crystal display cell which rotates polarized light by a selected number of degrees.

18. The method of claim 16 wherein each of the first and second substrates have an electrode film on at least the side adjacent to said evaporation source.

* * * * *

Disclaimer 3,964,158.—*John L. Janning*, Dayton, Ohio. METHOD OF MAKING A LIQUID CRYSTAL DISPLAY CELL. Patent dated June 22, 1976. Disclaimer filed Nov. 10, 1980, by the assignee, *NCR Corporation*.

The term of this patent subsequent to Sept. 10, 1991, has been disclaimed.

[*Official Gazette January 27, 1981.*]